United States Patent [19]

Boutillier et al.

[11] Patent Number: 5,324,778
[45] Date of Patent: Jun. 28, 1994

[54] PROCESS FOR PREPARING NOVEL MOISTURE-CURABLE HOT-MELT ADHESIVE COMPOSITIONS

[75] Inventors: Jacques Boutillier, Reilly la Montagne; Yves Lermat, Serquigny, both of France

[73] Assignee: Atochem, Puteaux, France

[21] Appl. No.: 972,214

[22] Filed: Nov. 5, 1992

Related U.S. Application Data

[62] Division of Ser. No. 467,260, Jan. 19, 1990, Pat. No. 5,189,096.

[30] Foreign Application Priority Data

Jan. 19, 1989 [FR] France ................ 89 00602

[51] Int. Cl.$^5$ .............................................. C08F 16/06
[52] U.S. Cl. ................................... 525/56; 524/503; 525/58; 525/60; 525/61; 525/374
[58] Field of Search .............. 525/56, 58, 60, 61, 525/374; 524/503

[56] References Cited

U.S. PATENT DOCUMENTS

| | | | |
|---|---|---|---|
| 3,632,789 | 1/1972 | Wilhelm et al. | 260/33.6 |
| 4,215,023 | 7/1980 | Strolle | 525/123 X |
| 4,295,910 | 10/1981 | Cooley et al. | 156/314 |
| 4,433,095 | 2/1984 | Hombach et al. | 524/575 X |

FOREIGN PATENT DOCUMENTS

| | | | |
|---|---|---|---|
| 0114654 | 11/1974 | Japan | 525/61 |
| 0064388 | 5/1975 | Japan | 525/61 |
| 0036264 | 11/1975 | Japan | 524/503 |
| 0037218 | 12/1975 | Japan | 525/61 |
| 0037739 | 4/1978 | Japan | 524/503 |
| 0085871 | 5/1982 | Japan | 524/503 |
| 0141274 | 8/1983 | Japan | 525/60 |
| 0552444 | 4/1943 | United Kingdom | 525/61 |
| 2041943 | 9/1980 | United Kingdom | 525/61 |

*Primary Examiner*—Judy M. Reddick
*Attorney, Agent, or Firm*—Burns, Doane, Swecker & Mathis

[57] ABSTRACT

Novel crosslinkable hot-melt adhesive compositions, curable by atmospheric moisture, include (i) the prepolymerizate of an hydroxylated ethylene/vinyl acetate copolymer with a stoichiometric excess of a polyisocyanate, e.g., a diisocyanate, such prepolymerizate containing an effective crosslinkable amount of free isocyanate functional groups, and, optionally, (ii) an adhesive tackifying resin.

4 Claims, No Drawings

PROCESS FOR PREPARING NOVEL MOISTURE-CURABLE HOT-MELT ADHESIVE COMPOSITIONS

This application is a divisional of application Ser. No. 07/467,260 now U.S. Pat. No. 5,189,096 filed Jan. 19, 1990.

BACKGROUND OF THE INVENTION

1. Field of the Invention

The present invention relates to novel crosslinkable hot-melt adhesive compositions including a prepolymer containing free isocyanate functional groups which comprises the product of reaction between an ethylene/vinyl acetate copolymer containing hydroxyl functional groups and a polyisocyanate.

The compositions of this invention, typically combined with an adhesive (tackifying) resin, enable production of adhesive bonds which withstand elevated temperatures after crosslinking of the free NCO functional groups, usually under the influence of atmospheric moisture.

2. Description of the Prior Art

The adhesives known to this art are generally in liquid form and become rigid after application, while ensuring the bonding of the surfaces to be united. This stiffening usually results from the polymerization or polycondensation of the basic components of the adhesive.

For a number of years, ever increasing attempts have been made to provide adhesive compositions in solid form as well. These include the hot-melt adhesives which are based on a thermoplastic resin, solid at room temperature, possessing adhesive properties. Such adhesives become fluid when heated, the bonding of the surfaces to be united being ensured when the adhesive again becomes rigid on cooling. These hot-melt adhesives are generally prepared by the combination of two basic constituents: a thermoplastic resin and an adhesive (tackifying) resin, with which there may be combined additives such as waxes, stabilizers, fillers, plasticizers, and others. The most widely used basic thermoplastic resins are the polyamides, atactic polypropylene and, in particular, ethylene/vinyl acetate (EVA) copolymers. In the present state of this art, these hot-melt adhesives have good adhesive properties, but have the disadvantage of exhibiting poor heat strength, a strength which barely exceeds 70° to 80° C.

To overcome this disadvantage, a new generation of crosslinkable hot-melt products has been developed: crosslinkable polyurethane hot-melt adhesives. These adhesives are prepared in conventional manner by reaction of a polyisocyanate with polyols of polyester type, at least one of which is solid at room temperature. Such adhesives are applied at high temperature in the molten state. They have the disadvantage of being incompatible with the adhesive (tackifying) resins, which greatly restricts their formulation options. This is then reflected in a limited capacity for adhesive bonding to certain well-defined supports and substrates. In addition, these products have "open times" on the order of a few minutes, and this is too long for certain high-rate applications. The "open time" of a hot-melt adhesive is the time available to effect the adhesive bonding, between the time when the adhesive in the molten state is applied to the first support to be bonded and the time when the hot-melt adhesive is no longer sufficiently fluid to permit the second support to be properly assembled.

Another type of crosslinkable hot-melt adhesive has been developed from hydroxylated ethylene/vinyl acetate copolymers reacted with a blocked polyisocyanate in stoichiometric amount, as described in JP 108,484 or European Application 88/401,259. These particular hot-melt adhesives, which are compatible with the adhesive (tackifying) resins, have good adhesive properties, but present the disadvantage of requiring heat treatments at temperatures of at least 120° C. for several minutes to ensure that they are well crosslinked. Such adhesive bonding conditions are not acceptable in the case of certain thermally sensitive supports.

SUMMARY OF THE INVENTION

Accordingly, a major object of the present invention is the provision of novel crosslinkable hot-melt adhesive compositions that can be crosslinked under the effect of atmospheric moisture at temperatures below 120° C., typically at temperatures ranging from 10° to 60° C.

Briefly, the present invention features crosslinkable hot-melt adhesive compositions essentially comprising the product of a reaction between EVA copolymer containing hydroxyl functional groups and a polyisocyanate, wherein the starting materials are introduced in such proportion that the ratio of the NCO functional groups of the polyisocyanate to the OH functional groups of the EVA is less than or equal to 5 and greater than 1.

DETAILED DESCRIPTION OF THE PREFERRED EMBODIMENTS OF THE INVENTION

More particularly according to the present invention, the subject crosslinkable thermoplastic adhesive compositions may be employed alone, insofar as the initial melt viscosity of the hydroxylated ethylene/vinyl acetate copolymer ranges from 0.1 to 100 Pa s. However, it is also within the ambit of the invention to employ a composition whose initial melt viscosity of the copolymer is higher than 100 Pa s and lower than 10,000 Pa s, but, in this case, the prepolymer is combined with an adhesive (tackifying) resin. In such combination of the adhesive composition/prepolymer with the adhesive (tackifying) resin, the melt viscosity of the mixture preferably ranges from 0.1 to 100 Pa s.

It is also within the ambit of the invention to combine an adhesive resin with the prepolymer, even when the initial ethylene/vinyl acetate copolymer has a melt viscosity lower than 100 Pa s, this being for the purpose of lowering the melt viscosity of the mixture below 100 Pa s.

In order to provide the envisaged melt viscosity, an adhesive (tackifying) resin may be combined with the adhesive composition in proportions of 0 to 70 parts by weight of adhesive (tackifying) resin per 100 to 30 parts by weight of crosslinkable thermoplastic adhesive composition.

Under the conditions of the invention, it is recommended that the prepolymer resulting from the hydroxylated EVA-polyisocyanate reaction, or the mixture of prepolymer and of adhesive (tackifying) resin, should have a determined viscosity, namely, be sufficiently fluid to permit a rapid setting of the adhesive bond at a relatively low temperature in an atmospheric environment in order to produce an adhesive bonding which can subsequently withstand temperatures of at least 150° C.

As described above, the thermoplastic adhesive composition is produced by the reaction, when mixed in the molten state, between an EVA copolymer containing hydroxyl functional groups and a stoichiometric excess of polyisocyanate, resulting in a prepolymer containing free NCO functional groups, the content of free NCO functional groups in the prepolymer preferably ranging from 1% to 15% by weight. This content of NCO functional groups is expressed as the percentage by weight of free NCO functional groups relative to the total mass of prepolymer. The EVA containing free hydroxyl functional groups is a known copolymer of ethylene, of vinyl acetate and of an ethylenic monomer containing a primary or secondary hydroxyl functional group. This copolymer may be prepared, also in known manner, either by partial saponification of the vinyl acetate of the ethylene/vinyl acetate copolymer, or by grafting an amount of hydroxylated ethylenic monomer onto the backbone of the ethylene/vinyl acetate copolymer, or else by direct terpolymerization of the three monomers.

The ethylenic monomer containing a hydroxyl functional group preferably has the following general formula:

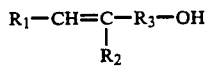

in which $R_1$ is hydrogen or a hydrocarbon radical containing from 1 to 8 carbon atoms; $R_2$ is hydrogen or a methyl radical; and $R_3$ is an ester, amide or $(CH_2)_n$ group wherein n is a number ranging from 0 to 10.

Exemplary of such monomers are hydroxyethyl acrylate, hydroxyethyl methacrylate, allyl alcohol, oleyl alcohol, vinyl alcohol and N-hydroxymethylacrylamide.

A preferred hydroxylated EVA composition comprises a combination by weight relative to the initial monomers of 45% to 93% of ethylene, of 5% to 40% of vinyl acetate and of 2% to 15% of ethylenically unsaturated monomer containing a hydroxyl functional group. This EVA preferably contains from $2 \times 10^{-2}$ to $15 \times 10^{-2}$ moles of OH per 100 g of copolymer.

The hydroxylated EVA is mixed in the molten state with a polyisocyanate, in a proportion as given above, containing at least two NCO functional groups per molecule. The polyisocyanate is preferably selected from among aliphatic, cycloaliphatic, aromatic and heterocyclic polyfunctional polyisocyanates.

Particularly preferred diisocyanates include toluene diisocyanate, diphenyhethane diisocyanate, hexamethyl diisocyanate and isophorone diisocyanate.

At the mixing temperature, which is typically below 120° C., the reaction between the NCO groups and the OH groups is rapid and is carried out over a few hours at most. The prepolymer obtained crosslinks in contact with atmospheric moisture; to be preserved properly, it must be stored in the absence of moisture.

When its melt viscosity is within the above acceptable range, this prepolymer alone constitutes the composition for a hot-melt adhesive capable of being crosslinked by moisture. When the prepolymer in the molten state is too viscous, it may be mixed, in order to reduce the viscosity, with an adhesive (tackifying) resin in a proportion such as already given above.

When it is determined that the prepolymer will have a melt viscosity which is too high, it is advantageous to add the adhesive (tackifying) resin in situ with the prepolymerization reactants: hydroxylated EVA and polyisocyanate.

While lowering the viscosity of the prepolymer, the adhesive (tackifying) resin can, impart an improved bonding power to the crosslinkable hot-melt adhesive. These resins are generally compounds having a low melting point, usually below 100° C., and have a low molecular weight on the order of 400 to 2,500. As their name implies, these resins contribute tack: a property which stems either from the high degree of plasticization of the prepolymer composition, or from a limited compatibility with the prepolymeric composition. These adhesive (tackifying) resins, which are per se known to the art, are categorized in three principal classes: (i) rosins and their hydrogenated, disproportionated, maleized and ester derivatives; (ii) terpene resins; and (iii) petroleum resins such as, for example, aliphatic, modified aliphatic, aromatic and hydrogenated resins.

Depending on the environmental moisture content and the bonding temperature, the crosslinking of the adhesive composition generally is effected in a time interval of between several hours and several days. This constitutes the usual crosslinking time for the polyurethane adhesives which are crosslinked by moisture. On the other hand, the open time of the novel crosslinkable hot-melt composition of the invention will be approximately that of the conventional hot-melt adhesives based on ethylene/vinyl acetate copolymers, namely, from several seconds to several tens of seconds.

In order to further illustrate the present invention and the advantages thereof, the following specific examples are given, it being understood that same are intended only as illustrative and in nowise limitative.

EXAMPLE 1

The following materials were introduced into a Brabender mixer controlled at 90° C., the blades of which were rotating at 50 revolutions per minute:

(i) 29.2 g of a terpolymer of the weight composition:
70% of ethylene,
25% of vinyl acetate,
5% of hydroxyethyl acrylate
(the melt index of the terpolymer was 10, measured at 190° C.-2.16 kg according to ASTM standard D-1238, and its melt viscosity was 8,000 Pa s);

(ii) 12.6 g of terpene/phenol resin (Dertophene T ®); and (iii) 12.6 g of ethylene/vinyl acetate wax (Wax AC430 ®).

When the mixture was homogeneous and its temperature had stabilized at 90° C., 2.8 g of isophorone diisocyanate were introduced. Kneading was continued for 10 minutes. The preparation having a viscosity of approximately 100 Pa.s was removed from the mixer and was then employed to effect the adhesive bonding of aluminum test specimens according to ASTM standard D 1002, in a press which made it possible to set the conditions of time: 1 minute, of temperature: 80° C. and of pressure: 1 bar.

The series of test specimens was divided into 4 batches. The 4 batches wee evaluated according to the shear flow SAFT (Shear Adhesion Failure Temperature) method. According to this method, a 1 kg load was suspended from a test specimen prepared for the shear test. The entire assembly was placed in an oven programmed for a temperature increase of 5° C. per minute. The SAFT is the temperature at which the joint ruptures. This measurement makes it possible to determine the maximum service temperature of the adhesive.

A test specimen batch No. 1 was stored in the absence of moisture and then measured on the day following the adhesive bonding.

A test specimen batch No. 2 was maintained for 7 days at 70° C. in the presence of saturated water pressure and was then measured 24 hours after having been removed from this accelerated moist aging treatment.

A test specimen batch No. 3 was measured after having remained for 7 days in the surrounding atmosphere and at room temperature.

A test specimen batch No. 4 was measured after having remained for 14 days in the surrounding atmosphere and at room temperature.

The joint separation temperatures were the following:

Batch No. 1 = 88° C.
Batch No. 2 = 210° C.
Batch No. 3 = 140° C.
Batch No. 4 = 225° C.

EXAMPLE 2

The following materials were introduced into a Brabender mixer controlled at 75° C., the blades of which were rotating at 50 revolutions per minute:

(i) 32 g of a terpolymer of weight composition:
71.1% of ethylene,
25% of vinyl acetate,
3.9% of hydroxyethyl acrylate
(the melt index of the terpolymer was 250, measured under the conditions of Example 1; its melt viscosity was 1,000 Pa s);

(ii) 16 g of terpene/phenol resin (Dertophene T ®).

When the mixture was homogeneous and its temperature had stabilized at 75° C., 3.6 g of isophorone diisocyanate were introduced.

The preparation had a viscosity of approximately 100 Pa s. As in Example 1, it was employed for effecting adhesive bonding of aluminum test specimens, the temperature being 60° C.

The SAFT, measured under the conditions described, was 70° C. in the case of the assemblies measured just after bonding and higher than 225° C. in the case of those measured after 1 week of natural or accelerated moist aging.

EXAMPLE 3

The following materials were introduced into a Brabender mixer controlled at 70° C., the blades of which were rotating at 50 revolutions per minute:

(i) 15 g of a terpolymer of weight composition:
82.7% of ethylene,
6.3% of vinyl acetate,
11% of vinyl alcohol (Melthene 6822 ®)
(the melt index of the terpolymer was 160, measured under the conditions of Example 1; its melt viscosity is 1,500 Pa s);

(ii) 15.6 g of a copolymer of the following composition:
72% of ethylene,
28% of vinyl acetate having a melt index of 800 (Evatane 28800 ®); and (iii) 15.6 g of terpene/phenol resin (Uravar 75205 ®).

When the mixture was homogeneous and its temperature had stabilized at 70° C., 13 g of isophorone diisocyanate were introduced.

The melt viscosity of the mixture was approximately 100 Pa s. Bonding of aluminum test specimens was effected at 70° C. for 1 minute at 1 bar.

The SAFT temperature behavior was 70° C. after bonding and higher than 225° C. after 7 days of accelerated moist aging.

EXAMPLE 4

(a) An ethylene/vinyl acetate copolymer containing 28% by weight of vinyl acetate and having a melt index of 2500 (Escorene MY 02528 ®) was partially hydroxylated in solution in methanol using sodium hydroxide at 50° C. for 8 hours.

The removal of the sodium acetate formed was carried out by washing with a mixture of water and acetone. The product was rinsed for a last time in acetone. The product obtained had the following characteristics:

| composition: | ethylene | 72.6% |
|---|---|---|
| | vinyl acetate | 22% |
| | vinyl alcohol | 6% |

The melt index was practically unchanged. Its melt viscosity was 80 Pa s.

(b) The following materials were mixed in a Brabender mixer at 90° C.:
36 g of the product produced in (a),
18.5 g of Dertophene T ®

After homogenization of the mixture, the temperature was decreased to 70° C. and 4.5 g of Isonate 143 ® (polyisocyanate constituted of 20% of phenyl isocyanate trimers and 80% of 4,4'-methylenediphenyl isocyanate (MDI).

The melt viscosity of the mixture obtained was approximately 10 Pa s.

This mixture was employed for manufacturing aluminum test specimen assemblies. The bonding conditions were 1 minute at 70° C. at 1 bar.

The SAFT temperature behavior was 60° C. after bonding, 85° C. after 1 day and higher than 225° C. after 4 days of natural aging or 7 days of accelerated aging.

(c) In the absence of moisture, this mixture could be stored for more than 9 days without any change in its degree of crosslinking, evaluated by measurements of gel content in toluene.

EXAMPLE 5

The following materials were mixed in the Brabender mixer for 10 minutes at 65° C.:
(i) 45 g of the hydrolyzed copolymer of Example 4;
(ii) 5.7 g of Isonate 143 ®.

The mixture obtained had a melt viscosity of 50 Pa s.

It was employed to produce aluminum test specimen assemblies. The bonding conditions were 1 minute at 70° C. at 1 bar.

The SAFT temperature behavior was 60° C. after bonding, 75° C. after 1 day and higher than 225° C. either after 7 days of accelerated moist aging or after 15 days of natural aging in the surrounding atmosphere.

EXAMPLE 6 (COMPARATIVE)

The following materials were homogenized in the Brabender mixer at 90° C.:
(i) 29.2 g of the terpolymer of Example 1;
(ii) 12.6 g of Dertophene T ®,
(iii) 12.6 g of Wax AC 430 ®;
(iv) 3.0 g of MDI blocked by epsiloncaprolactam, prepared as described in FR 2,616,155.

This mixture was employed under the conditions of Example 1 for the preparation of aluminum test specimen assemblies at a temperature of 80° C. for 1 minute at 1 bar.

The SAFT temperature behavior measured before and after natural aging for 14 days and accelerated moist aging for 7 days remained at 90° C. An adhesive composition of this type does not crosslink at ambient temperature.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a hot-melt adhesive composition of matter, comprising the prepolymerizate of an hydroxylated ethylene/vinyl acetate copolymer with a stoichiometric excess of a polyisocyanate said prepolymerizate containing an effective crosslinkable amount of free isocyanate functional groups, comprising prepolymerizing an hydroxylated ethylene/vinyl acetate copolymer with a stoichiometric excess of a polyisocyanate, wherein the prepolymerization reaction medium is in molten state, and wherein the ratio of the NCO functional groups of the polyisocyanate to the hydroxyl functional groups of said copolymer is greater than 1 but no more than 5.

2. The process as defined by claim 1, said molten prepolymerization reaction medium further comprising an adhesive tackifying resin.

3. The process as defined by claim 1, said hydroxylated ethylene/vinyl acetate copolymer comprising from $2 \times 10^{-2}$ to $15 \times 10^{-2}$ moles of hydroxyl functional groups per 100 g of said copolymer.

4. The process as defined by claim 1, said hydroxylated ethylene/vinyl acetate copolymer comprising from 45% to 93% of ethylene monomer, 5% to 40% of vinyl acetate monomer and 2% to 15% of an ethylenically unsaturated monomer comprising a hydroxy functional group.

* * * * *